United States Patent [19]

Elliott et al.

[11] 3,926,312

[45] Dec. 16, 1975

[54] DISK PACK ENCLOSURE

[75] Inventors: James Francis Elliott, Rochester; Joel Swenum Johnson, Millville, both of Minn.

[73] Assignee: International Business Machines Corporation, Armonk, N.Y.

[22] Filed: Sept. 9, 1974

[21] Appl. No.: 504,398

[52] U.S. Cl. .................................... 206/444

[51] Int. Cl.$^2$ ..................... B65D 85/02; G11B 1/02

[58] Field of Search ............ 206/444, 406; 220/327

[56] References Cited

UNITED STATES PATENTS

| | | | |
|---|---|---|---|
| 3,176,281 | 3/1965 | Pattison | 206/444 |
| 3,407,923 | 10/1968 | Mathus | 206/406 |

*Primary Examiner*—William T. Dixson, Jr.

*Attorney, Agent, or Firm*—Keith T. Bleuer

[57] ABSTRACT

An enclosure for a pack of magnetic disks including a cover for an assembly of a magnetic disk pack, supporting structure for the disk pack and a screw receivable in a screw threaded opening provided in the upper end of a disk drive shaft. Latching mechanism connects the cover with the disk pack assembly and holds the cover in a detented relationship with respect to the assembly. The latching mechanism includes a first cam which allows the cover to be removed from the disk pack assembly by a continued rotation of the cover in the direction in which the cover is used to move the screw into full engagement with the screw threaded opening in the drive shaft and includes a second cam of a milder slope than the first by means of which the cover may again be moved into latched relationship with respect to the disk pack assembly by a rotation of the cover in the opposite direction without unscrewing the screw from its receiving opening in the drive shaft as the cover is being reapplied to the pack assembly.

5 Claims, 5 Drawing Figures

DISK PACK ENCLOSURE

BACKGROUND OF THE INVENTION

The invention relates to magnetic disk packs for the recording of data and more particularly to enclosures for such disk packs.

It has previously been common practice to enclose disk packs in covers for shielding the disk packs when they are not in operative relationship with respect to a machine for magnetically reading and writing on the disks of the pack. Latching means have been provided in connection with the covers for temporarily holding the disk packs within the covers for storage purposes apart from the read/write machine until the disk packs are moved to and are mounted in position on such a machine.

SUMMARY OF THE INVENTION

It is an object of the present invention to provide an improved latching mechanism for connecting a cover with an assembly that includes a disk pack and a screw for temporarily fixing the assembly to a drive shaft for the disks, with the latching mechanism being such that the cover is held in latched detented relationship with respect to the disk pack assembly and with the latching mechanism releasing after the screw has fully engaged with the drive shaft on a continued turning of the cover in the screw engaging direction under an increased torque to overcome the detenting action of the latching mechanism.

It is also an object of the present invention to provide such an improved latching mechanism between a cover and a disk pack assembly whereby, after the cover has been previously separated from the disk pack assembly and with the disk pack assembly being in operative relationship with a machine for reading or writing on the disks, the cover may be effectively reattached to the pack assembly by rotative movement of the cover in the opposite direction. It is contemplated that the latching mechanism shall be such that the force required for reattaching the cover to the disk pack assembly and putting the latching mechanism into its detenting condition shall be less than the force originally used for removing the cover from the disk pack assembly in position on the read/write machine so that the screw is not unscrewed from its mating threaded opening in the drive shaft prior to a full reattachment of the cover to the disk pack assembly.

In a preferred form of the invention, the disk pack assembly includes a pin extending transversely with respect to the axis of the disk pack assembly and spring mounted cam means carried by the cover cooperating with the pin so that the cam means may move with respect to the pin. The cam means includes one cam on which the pin operates and which is relatively steep so as to cause the cover to move out of a detented attachment with respect to the disk pack assembly with a relatively great force applied to the cover in the direction to move a screw carried by the disk pack assembly fully into engagement with a mating threaded opening in the drive shaft for the disks and a cam of less slope with which the pin may cooperate and by means of which the cover is again moved into detented latched relationship with the disk pack when the cover is reapplied onto the disk pack after having been removed therefrom and is rotated in the opposite direction, without causing the screw to be unscrewed from its opening prematurily on such rotation of the cover in the opposite direction.

BRIEF DESCRIPTION OF THE DRAWINGS

Referring to FIGS. 1 and 3 in particular, the disk pack enclosure of the invention may be seen to comprise a cover 30 which is adapted to fit over an assembly 32 for a stack 34 of flexible disks 36.

Figure 1:
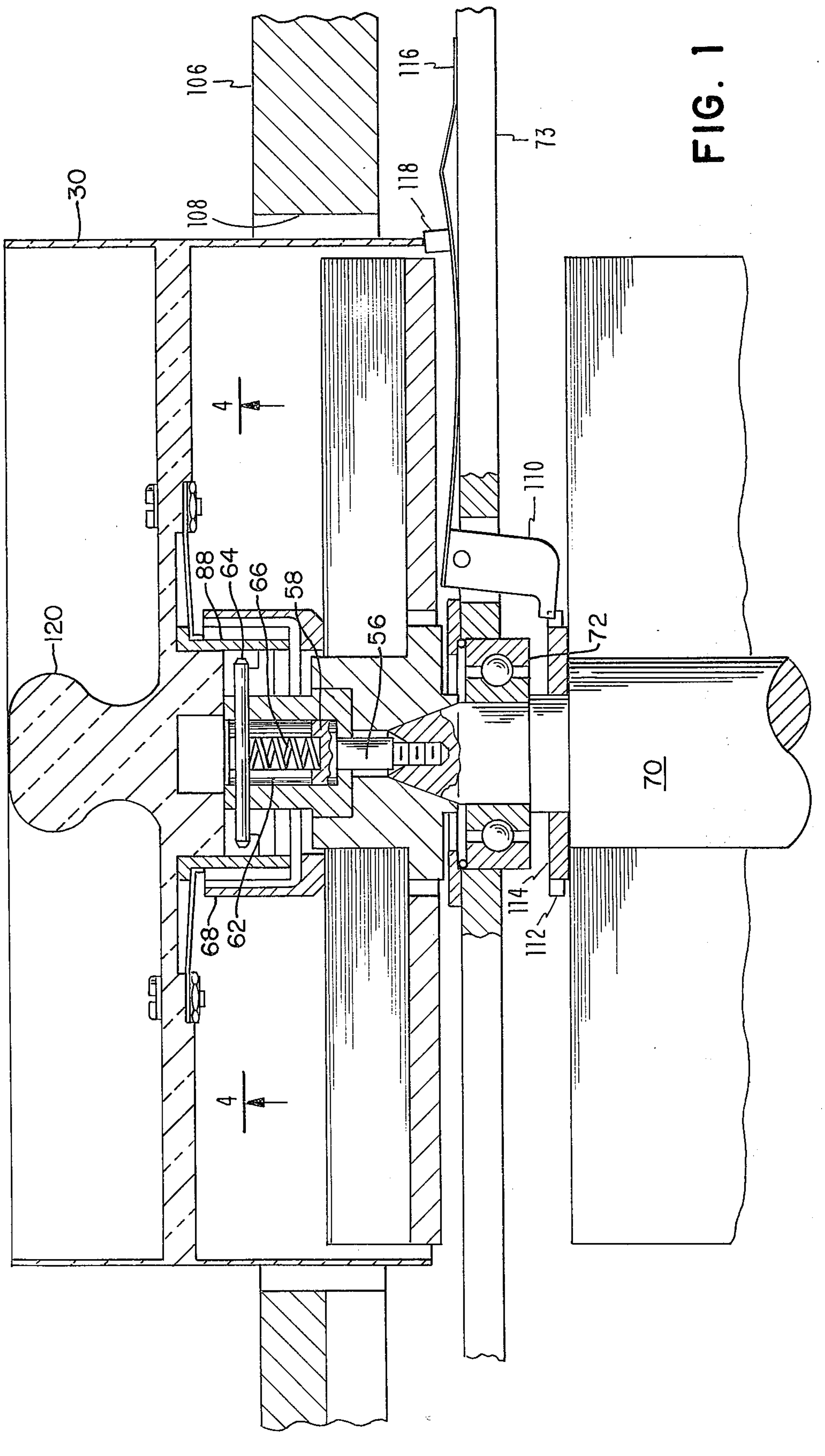
FIG. 1 is a longitudinal sectional view of the disk pack enclosure of the present invention.

The assembly 32 may be seen to comprise a pack hub 40 extending through the disk pack 34 and a top plate 42. The hub 40 and plate 42 are fixed together by means of screws 44 so as to hold the disk pack 34 fixed with respect to these parts. The disks 36 may each, for example, have a thickness of about 0.003 inch and may be made of polyethylene terephthalate, so that the disks are thin and flexible. Each disk may have an unoriented $Fe_2O_3$ coating on both sides, and spacers of about 0.007 inch thickness may be disposed between the disks 36 at the inner peripheries of the disks. Thus, when the disks 36 are in rotation, the disks individually are substantially flat due to centrifugal force and have a spacing of 0.007 inch between them.

The hub 40 has formed in it a downwardly facing conical cavity 46 and an upwardly facing cylindrical cavity 48. A hub 50 is disposed within the cavity 48, and a portion of the plate 42 overlies the hub 50 for retaining the hub 50 within the cavity 48. The hub 50 is loosely disposed in the cavity 48 as partially closed by the plate 42 to be rotatable therein. The hub 50 has connected openings 52 and 54 through it which are of respectively relatively large and small diameters, and a screw 56 extends through the small diameter opening 54. The screw 56 has a relatively large diameter upper portion 58 with a cavity 60 and a longitudinal slot 62 therein. A pin 64 extends through and has a drive fit with respect to the hub 50, and the pin 64 extends through the slot 62 in the screw 56. The pin 64 extends transversely with respect to the longitudinal center A of the hub 50, as is apparent. A spring 66 is provided in the cavity 60 and extends between the bottom of the cavity 60 and the pin 64. The top plate 42 has an upwardly extending skirt 68 the inner surfaces of which are spaced from the ends of the pin 64.

The hub 40 is adapted to be mounted on a spindle shaft 70 which is rotatably disposed in a bearing 72 carried by a fixed frame 73. Shaft 70 is rotatably driven from any suitable prime mover (not shown). Shaft 70 has a tapered upper end 74, and the hub 40 fits over the shaft 70 with the tapered shaft end 74 fitting within the tapered cavity 46 of the hub 40. The shaft 70 is provided with a screw threaded central opening 76 for receiving the screw 56. A pack 78 of disks 80 are mounted on the shaft 70 and are fixed with respect to the shaft 70 by any suitable means (not shown). The disks 80 may be of the same type as the disks 36 and are also spaced apart by spacers at the centers of the disks. A magnetic read head 82 is suitably supported so that the head 82 may move both vertically in direction B and also transversely in direction C. The head 82 may thus be moved vertically to correspond with the spaces between any two of consecutive disks 80 or consecutive disks 36, when hub 40 is mounted on the upper end of shaft 74 as just mentioned and the disk pack 34 is thus positioned directly over the disk pack 78, and the head 82 may then be moved between a pair of disks 80 or disks 36.

Figure 4:
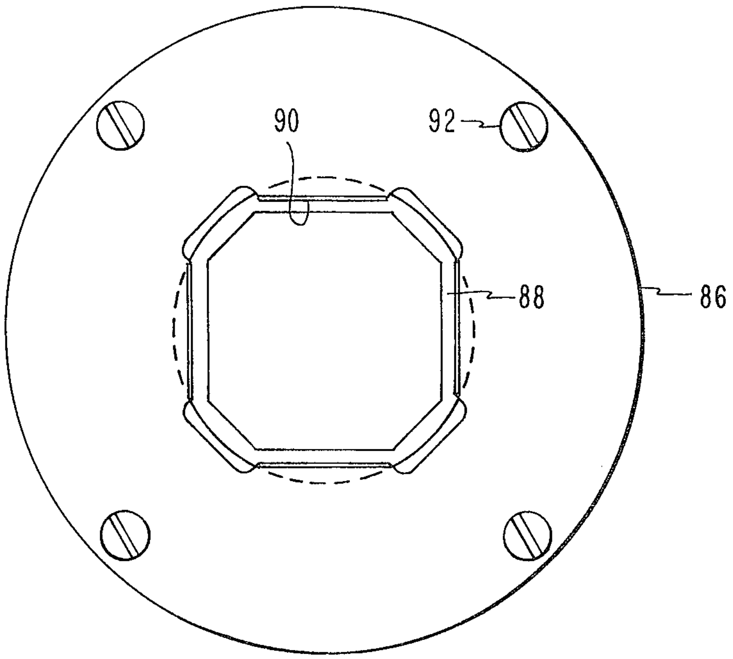
FIG. 4 is a sectional view taken on line 4—4 of FIG. 3 in the direction indicated.
Figure 5:
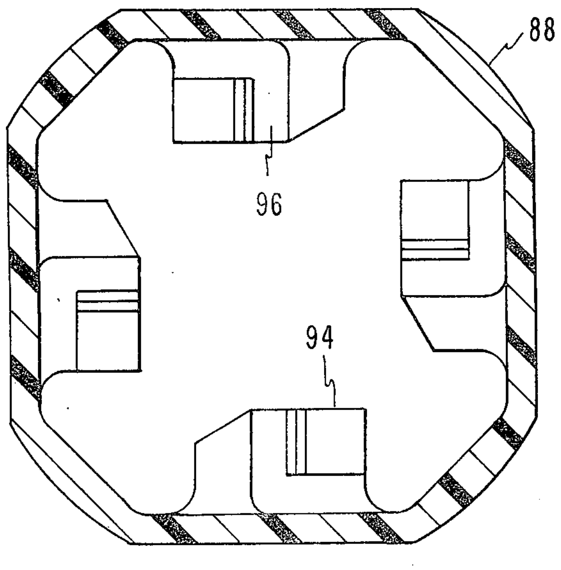
FIG. 5 is a sectional view taken on line 5—5 of FIG. 3 in the direction indicated.

A drive hub 84 is disposed on the bottom surface of cover 30 and is held thereon by means of a clamping spring 86. The hub 84 has a downwardly extending skirt 88, and it will be observed from FIG. 4 that this is square in shape (except at the corners). The skirt 88 extends through a central opening 90 in spring 86, and opening 90 is also generally square in shape to thus hold hub 84 from rotation with respect to the spring 86. The spring 86 is fixed at its outer edges to the cover 30 by means of screws 92.

Figure 3:
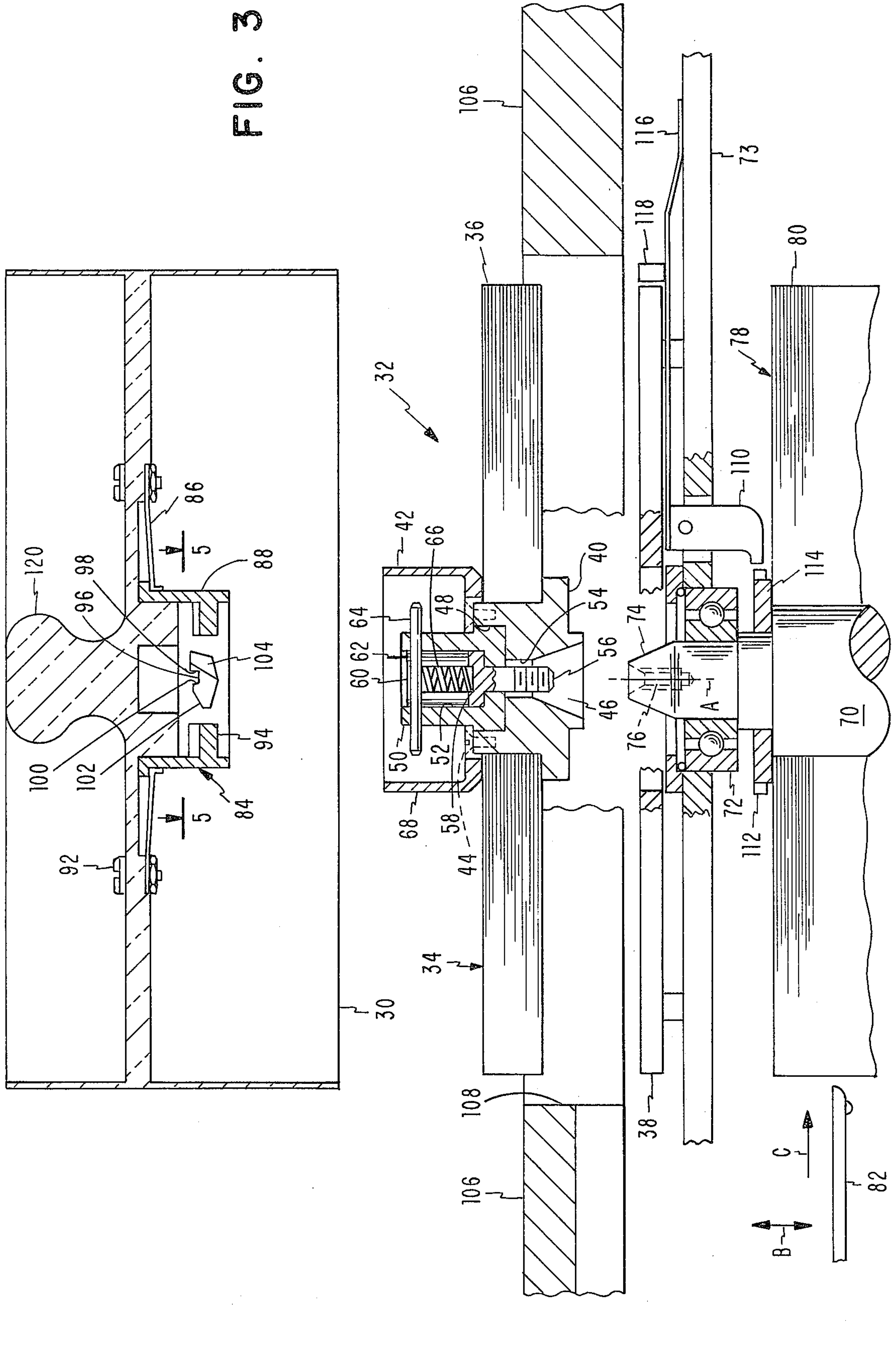
FIG. 3 is an exploded view of the parts of the enclosure including a cover, a magnetic disk pack assembly and additional magnetic disks permanently mounted on a disk drive shaft.

The hub 84 is provided with four spaced, inwardly extending projections or lug portions 94 at the bottom of the skirt 88. Each of the lug portions 94 is provided with a downwardly extending notch 96 defined by an abutment surface 98 extending vertically (parallel to the longitudinal center A of the disk pack 34, shaft 70 and cover 30 as seen in FIG. 3) and by a cam surface 100 slanting slightly with respect to vertical. Each of the lug portions 94 is also provided with a cam surface 102 which is remote from the notch 96 and extends at a greater acute angle with respect to vertical than does the cam surface 100. Each of the projections 94 is also provided with a cam surface 104 on its bottom extending at about 45° with respect to vertical as the projections 94 are shown in FIG. 3.

A plate 106 is fixed with respect to frame 73 and has a round opening 108 through it for guiding the cover 30 downwardly as seen in FIG. 3 into proper position with respect to shaft 70. The frame 73 has a pawl 110 swingably mounted on it, and the pawl 110 is adapted to engage with teeth 112 on a locking ring 114 fixed with respect to shaft 70. A leaf spring 116 is fixed on the upper end of the pawl 110 and has its opposite end bearing against the upper surface of frame 73. A lug 118 is fixed to the spring 116 and is so positioned that the cover 30, in being moved into proper position with respect to the shaft 70 and disks 80, contacts the lug 118 and flexes the spring 116 so as to rotate the pawl 110 to engage with ring 114 whereby the ring 114 and shaft 70 are held stationary. The screw 56 may thus easily be screwed into or out of the threaded opening 76 in the upper end of the shaft 70.

The cover 30 is provided with a handle 120 by means of which the cover 30, along with the disk stack 34, may be transported.

Although in FIG. 3 the disk pack 34 and its supporting parts including the pack hub 40 and top plate 42 are shown separated from both the cover 30 and the lower disk assembly including spindle shaft 70 and disk pack 78, normally, in operation, the disk pack 34 and its supporting parts are connected to either the cover 30 or else to the spindle shaft 70. In the former condition, the cover 30 with disk pack 34 therein may be transported to and from storage; while, in the latter condition, the disk pack 34 is in operative relationship with respect to the disk pack 78 so that either the disks 80 or 36 may be accessed by the magnetic head 82. The cover 30, under the latter condition, may be stored in any suitable spot separate from the disks 36 and 80. Any suitable casings or covers (not shown) may be provided for shielding the disks 36 and 80 when the head 82 is operative on the disks.

It will be assumed first that the screw 56 is fully screwed into the threaded opening 76 in the shaft 70 and that the surfaces of the hub 40 forming the conical cavity 46 are in contact with the tapered shaft end 74 on shaft 70. It is assumed also that cover 30 is disassociated from the disk pack 34 and its supporting parts. Under these conditions, the disks 36 are in alignment with the disks 80; and all of these disks are drivingly rotated by the shaft 70. The magnetic head 82 may be moved either upwardly or downwardly, in the direction B, in order to position the head 82 opposite the gap between the flexible disk on which magnetic reading or writing is intended and the disk immediately thereabove. At this elevation, the head 82 is then moved in direction C and inwardly toward the shaft 70, so as to bring the head 82 over the magnetic track of the disk below the head 82 on which magnetic reading or writing may take place. It is intended that the disks 80 shall be more or less permanently attached on the shaft 70, while the disks 36 in the form of pack 34 may be easily removed, such as for the substitution of a similar pack 34 with different data on the disks 36 and supported by parts identical with the parts 42, 40, etc.

The disk pack 34 is removed from the shaft 70 by first positioning the cover 30 on top of the disk pack 34. The skirt 88 is moved downwardly to bring the skirt 88 into the skirt 68, with the pin 64 passing between adjacent ones of the projections 94. The cover 30 is then rotated counterclockwise (see FIG. 2) using handle 120, and the pin 64 rides up the cam surfaces 102 on opposite ones of the projections 94 and into the notches 96 of these projections 94. The pin 64 resting in the notches 96 thus effectively attaches the cover to the hub 50 and thus to the disk pack 34 and its supporting parts. The spring 86 flexes to allow movement of the pin 64 over the cam surfaces 102, and the square opening 90 in the spring 86 assures that the hub 84 and cover 30 rotate together. After the pin 64 is in the notches 96, continued rotation of the hub 30 in the counterclockwise direction (see FIG. 2) brings the vertically extending edges 98 against the pin 64 so that the screw 56 is unscrewed from the shaft 70. The cover 30 and assembly 32 are effectively connected together, since the pin 64 is resting in the notches 96; and the cover 30 and disk pack 34 together with the supporting parts for the pack 34 forming assembly 32 are lifted as a unit away from the disk pack 78. The cover 30, under this condition, completely covers the disk pack 34; and the disk pack 34 as supported by pack hub 40 may be stored along with cover 30 in any suitable spot, with the cover 30 shielding the disk pack 34 from possible injury.

When it is desired to position the disks 36 as supported by parts 40, 42, etc. (or an assembly of identical such parts with different information being written on the disks 36) in position on top of and in alignment with the permanent disks 80, the cover 30 holding the disks 36 by virtue of the pin 64 fitting in the notches 96 is positioned over the disks 80 so that the screw 56 seats in the upper entrance end of the threaded opening 76. Under these conditions, the screw 56 is moved upwardly against the action of the spring 66, and the conical sides of the cavity 46 are in engagement with the tapered upper end 74 of the shaft 70 so as to properly position the assembly 32 with respect to the shaft 70. The cover 30, using the handle 120, is then rotated in the clockwise direction (see FIG. 2), and the screw 56 is screwed into the opening 76. The drive from the cover 30 to the pin 64 and thus to the screw 56 is through the relatively abrupt cam surfaces 100 on the projections 94; and the spring 86 under these conditions holds the drive hub 84 in contact with the bottom surface of the cover 30.

Figure 2:
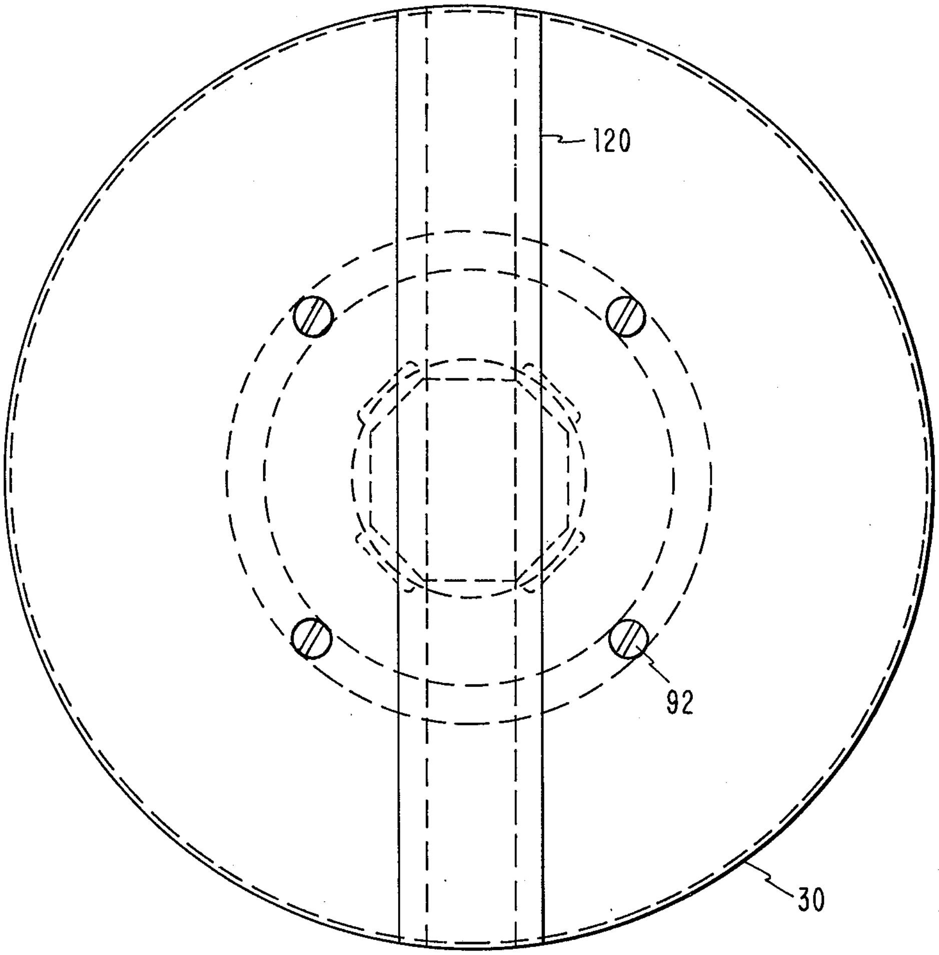
FIG. 2 is a top view of the enclosure.

On continued rotation of the cover 30 in the clockwise direction as seen in FIG. 2, the pin 64 moves over the cam surfaces 100, and the hub 84 moves downwardly against the action of spring 86 to allow this movement of the pin 64. The pin 64 then travels down the cam surfaces 102 to spaces between the inwardly extending projections 94 to completely release the cover 30 with respect to the pin 64 and thus with respect to the assembly 32. The disks 36 are then again in position along with the disks 80 for a reading or writing action by the head 82.

It has been noted that the slope of the cam surfaces 102 is relatively mild as compared to the slope of the cam surfaces 100, that is, the cam surfaces 100 and 102 extend at relatively small and large acute angles to the longitudinal center A, respectively, as the parts are shown in FIG. 3. The cam surfaces 100 are used for tightening the screw 56 in the threaded opening 76, before the cover 30 releases on the application of a predetermined torque on the cover 30 with continued rotation of the cover 30 in the clockwise direction as seen in FIG. 2. The relatively mild cam surfaces 102 are used for again applying the cover onto the disk pack 34 on rotation of the cover 30 in the counterclockwise direction as seen in FIG. 2; and, since the cam surfaces 102 are relatively mild with respect to the cam surfaces 100, a lesser amount of torque applied to the cover 30 is required in order to cause the pin 64 to move into the notches 96 to fix the disk pack 34 with respect to the cover 30. Thus, the relatively mild cam surfaces 102 assure that the cover 30 is fixed with respect to the disk pack assembly 32 before an untightening rotation of the screw 56 takes place with respect to the threads in the opening 76 of the shaft 70.

The pin 64 and the inwardly extending projections 94 of the hub 84, with the pin 64 resting in the notches 96, thus provide a releasable latching mechanism for connecting the cover 30 with respect to the disk assembly 32. The latching mechanism provides a detenting action due to the side surfaces 98 and 100 of the notches 96 and the spring 86 releasably holding the hub 84 in its uppermost position in contact with the lower surface of the cover 30 and holding the pin 30 at the bottoms of the notches 96. With the disk assembly 32 being thus latched within the cover 30, the cover 30 provides protection for the disks 36; and the assembly 32 protected by cover 30 may be stored at any suitable spot away from the machine that includes the permanent disks 80 and the magnetic head 82. The cover 30, as is apparent, is also used as a tightening and untightening tool for the screw 56 with respect to the threaded opening 76 in the disk drive shaft 70. The cam surfaces 100 limit the tightening action by the cover 30 to a predetermined torque before the cover 30 is released by the pin 64 acting as a detent, and the relatively mild cam surfaces 102 allow the cover 30 to be attached with respect to the disk assembly 32 with a predetermined less torque before the cover 30 acts to transmit full torque to the screw 56 by means of the vertical abutment surfaces 98, assuring that the assembly 32 is always fixed within the cover 30 before an unscrewing action occurs for removing the assembly 32 with respect to the shaft 70 and the permanent disk pack 78. The cam surfaces 104 on the inwardly extending projections 94 function to cam the cover 30 upwardly (see FIG. 3) by means of the pins 64 if the cover 30 is mistakenly rotated clockwise instead of counterclockwise (FIG. 2) in an attempt to fix the cover on the disk assembly 32, with the assembly 32 being disposed on and fixed to the shaft 70 by means of the screw 56.

We claim:

1. In combination, a magnetic disk support means for holding a plurality of magnetic disks in the form of a stack, a screw carried by and having a nonrotatable connection with said disk support means and adapted to be screwed into a threaded opening in the end of a disk stack drive shaft, a cover for covering the stack of disks, and connecting means connecting said cover and said disk support means whereby the cover is fixed with respect to the disk support means, said connecting means including connection making means of such construction to provide a relatively low torsional force on said screw in the direction tending to unscrew the screw from said threaded opening when said cover is rotated in one direction to affix the cover with respect to said disk support means and including connection breaking means which is of such construction as to break said connection between said cover and said disk support means upon a relatively higher torsional force being applied onto said cover in the direction tending to move said screw farther into said threaded opening.

2. The combination as set forth in claim 1, said connection making means including a cam which is relatively gradual and said connection breaking means including a cam which is relatively abrupt so that said connection making means is effective on a lower torsional force applied to said cover than the force applied onto the cover in breaking the connection between said cover and said disk support means.

3. In combination, a disk support element for holding a plurality of magnetic disks in the form of a stack, a screw carried by and having a nonrotatable connection with said support element and adapted to be screwed into a threaded opening in the end of a disk stack drive shaft, a cover element for covering said disk stack, and means for connecting said two elements together so that the cover element covers the disk stack and including a pin member carried by one of said elements and resting in a notch provided in a second member carried by said other element and a spring effective on one of said members, said second member having a relatively abrupt cam across which said pin member may move out of said notch with stressing of said spring with torsional movement being applied onto said cover element in a direction tending to move said screw farther into said threaded opening for disassociating said two elements, said second member having a second cam across which said pin member may move into said notch which is relatively mild compared to said abrupt cam so that said cover element may be attached to said disk support element with rotation of said cover element in the opposite direction and with said pin member moving over said relatively mild cam with stressing of said spring.

4. The combination as set forth in claim 3, said pin member being fixed with respect to said disk support element and said second member being a part of a skirt which is nonrotatably fixed with respect to said cover element with said spring limiting the longitudinal movement of said skirt so that said spring allows relative movement of said pin member with respect to and over said cams, said second member including said notch in which said pin member rests under action of said spring so as to act as a detent holding said elements together until said cover element is rotated in a direction to cause said pin member to move over said abrupt cam and disassociate said cover element with respect to said disk support element.

5. The combination as set forth in claim 3, said second member having said cams on one side of said notch and having an abutment face on the other side of said notch on which said pin member may bear after it has passed across said mild cam so as to complete the untightening movement of said screw with respect to said threaded opening.

* * * * *